March 25, 1924.
W. T. ROWEN
SHEARS
Filed Aug. 21, 1922
1,487,808
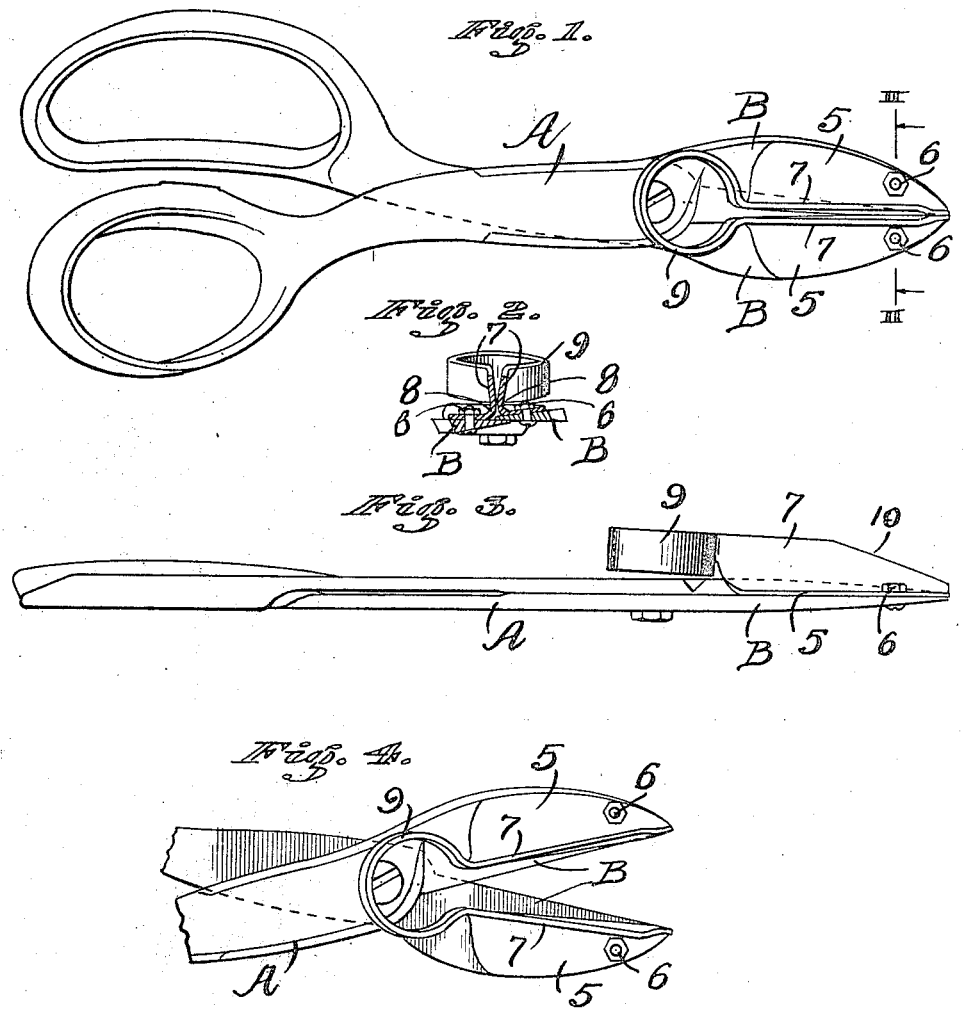
INVENTOR.
W. T. ROWEN
BY
ATTORNEYS.

Patented Mar. 25, 1924.

1,487,808

UNITED STATES PATENT OFFICE.

WILLIAM T. ROWEN, OF PALO ALTO, CALIFORNIA.

SHEARS.

Application filed August 21, 1922. Serial No. 583,321.

*To all whom it may concern:*

Be it known that I, WILLIAM T. ROWEN, a citizen of the United States, and a resident of Palo Alto, county of Santa Clara, State of California, have invented a new and useful Shears, of which the following is a specification.

My invention relates in general to shears, and more particularly to those shears which are used for pruning and the like purposes, especially in cases where shrubbery and the like is to be trimmed.

The primary object of my invention is to provide means on the shears to co-operate with the cutters for holding the severed end of an object so as to avoid the necessity of using the hands to hold or pick up the severed end of the shrubbery.

The invention possesses further objects and features which will appear as the description now proceeds with reference to the accompanying drawing which illustrates the preferred embodiment of said invention.

In said drawing Figure 1 is a plan view of a pair of shears illustrating the application of the invention; Figure 2 is a cross section on the line 2—2 of Figure 1; Figure 3 is a view of a side elevation of a pair of shears with the invention applied thereto, and Figure 4 is a detailed view in plan showing my device as applied.

I wish it to be first understood before proceeding with the detailed description that my invention is in no way confined exclusively to use in combination with the particular kind of shears shown in the drawing, as the principle of the invention may be applied to various types of cutters.

Referring now to the drawings in detail, A represents the shears which are made with the usual cutters B. I prefer to construct my invention from a single piece of sheet metal and to cut the metal and otherwise form it to leave attaching flanges (5) for mounting the device to the cutters B of the shears. The flanges may be mounted to the cutters by rivets, bolts, or any other convenient way, for instance as shown at (6). In reality my invention is concerned primarily with a pair of clamping jaws (7) adapted to co-operate with the cutters B for clamping the severed end of a stem or the like so that it may be held by the shears after the cutters have severed it. The confronting parallel faces of the jaws (7) are disposed in a plane transversely of the cutters. The jaws (7), of course, are made as an integral part of the flanges (5), and by referring to Figure 2 it will be clearly understood just how the same will act to clamp the severed end of a stem, and attention is called to the fact that owing to the bend of the jaws at the points (8) it makes no difference what part of the length of the cutters severs the stem, as the clamping jaws will clamp the same securely so long as it is presented between them.

The material of the jaws is also cut and formed to leave a spring band (9) joining the jaws, and so formed as to exert an opening effect on the cutters of the shears, which, of course, is highly desirable. This band (9) consequently not only properly anchors the clamping jaws so that they may function, but also takes the place of the ordinary spring which is used for opening the shears after the cutters have been brought together in a cutting action.

The front edges of the clamping jaws (7) are slanted as at (10) so that the shears may be presented in the corners and around obstructions.

I claim:

In combination, a pair of shears and clamping jaws therefor, the jaws being made from a single piece of sheet metal having flanges corresponding substantially to the width and shape of the faces of the cutters of the shears for attaching the jaws to the cutters of the shears with the confronting parallel faces of the jaws disposed in a transverse plane relatively of the cutters, the material of the jaws being looped to provide a spring band at the rear ends of the jaws, and said spring band adapted to exert an opening effect on the cutters.

WILLIAM T. ROWEN.